US008516448B2

(12) United States Patent
Morgia et al.

(10) Patent No.: US 8,516,448 B2
(45) Date of Patent: Aug. 20, 2013

(54) IDENTIFYING INTERPRETED PROGRAMS THROUGH CLASS LOADING SEQUENCES

(75) Inventors: Claudio Morgia, Rome (IT); Fabio Paone, Rome (IT); Antonio Secomandi, Milan (IT)

(73) Assignee: International Business Machines Corporation, Armonk, NY (US)

( * ) Notice: Subject to any disclaimer, the term of this patent is extended or adjusted under 35 U.S.C. 154(b) by 1191 days.

(21) Appl. No.: 11/962,643

(22) Filed: Dec. 21, 2007

(65) Prior Publication Data

US 2008/0152071 A1 Jun. 26, 2008

(30) Foreign Application Priority Data

Dec. 21, 2006 (EP) .................................... 06126805

(51) Int. Cl.
G06F 9/44 (2006.01)
G06F 9/45 (2006.01)
G06F 11/34 (2006.01)

(52) U.S. Cl.
USPC ........... 717/127; 717/126; 717/128; 717/130; 717/139; 714/45

(58) Field of Classification Search
None
See application file for complete search history.

(56) References Cited

U.S. PATENT DOCUMENTS

| | | | | |
|---|---|---|---|---|
| 5,754,861 A * | 5/1998 | Kumar | | 717/128 |
| 6,173,446 B1 * | 1/2001 | Khan et al. | | 717/127 |
| 7,076,768 B2 * | 7/2006 | Li et al. | | 717/132 |
| 7,305,677 B2 * | 12/2007 | Marcey et al. | | 719/310 |
| 7,360,206 B1 * | 4/2008 | Hatcher | | 717/139 |
| 7,877,734 B2 * | 1/2011 | Branda et al. | | 717/130 |
| 2002/0046398 A1 * | 4/2002 | Osborne et al. | | 717/126 |
| 2003/0101445 A1 * | 5/2003 | Li et al. | | 717/170 |
| 2004/0015879 A1 * | 1/2004 | Pauw et al. | | 717/127 |
| 2005/0262490 A1 | 11/2005 | Thomborson et al. | | |
| 2005/0268290 A1 | 12/2005 | Cognigni et al. | | |
| 2006/0026430 A1 | 2/2006 | Luo | | |
| 2006/0107256 A1 * | 5/2006 | Zarenin et al. | | 717/127 |
| 2006/0179357 A1 * | 8/2006 | Bergstrom | | 714/45 |

(Continued)

FOREIGN PATENT DOCUMENTS

WO 9964973 A1 12/1999

OTHER PUBLICATIONS

Renaud, K., Hercule: Non-invasively Tracking Java Component-Based Application Activity, Object-Oriented Programming Lecture Notes in Computer Science, vol. 1850, 2000, pp. 447-471, [retrieved on Apr. 5, 2013], Retrieved from the Internet:<http://link.springer.com/chapter/10.1007%2F3-540-45102-1_22>.*

(Continued)

*Primary Examiner* — Thuy Dao
*Assistant Examiner* — Geoffrey St Leger
(74) *Attorney, Agent, or Firm* — Lee Law, PLLC; Christopher B. Lee (57) ABSTRACT

A solution is proposed for metering the usage of Java programs. For this purpose, each Java program to be metered is associated with a fingerprint defined by a reference sequence of classes that must be loaded for its execution. The sequence of classes that are actually loaded by the Java Virtual Machine (JVM) is monitored, for example, by means of a wrapper for a class loader of the JVM. The sequence of loaded classes is then used to identify the Java program in execution (which fingerprint matches this sequence of loaded classes).

20 Claims, 6 Drawing Sheets

(56) References Cited

U.S. PATENT DOCUMENTS

| | | |
|---|---|---|
| 2006/0195906 A1 | 8/2006 | Jin et al. |
| 2008/0250502 A1* | 10/2008 | Sole ............................ 726/23 |
| 2010/0218170 A1* | 8/2010 | MacLellan et al. ........... 717/127 |

OTHER PUBLICATIONS

Schneier, B., et al., Remote Auditing of Software Outputs Using a Trusted Coprocessor, Future Generation Computer Systems, vol. 13, Issue 1, Jul. 1997, pp. 9-18, [retrieved on Apr. 5, 2013], Retrieved from the Internet:<http://www.sciencedirect.com/science/article/pii/S0167739X97000046#>.*

Collberg, C., et al., "Sandmark—A Tool for Software Protection Research", IEEE Security & Privacy IEEE USA, vol. 1, No. 4, pp. 40-49 (Jul. 2003).

Beaux Sharifi, "Software Watermarking", URL:http://cs.uccs.edu/(cs591/studentproj/projF2005/bpsharif/dock/SoftwareWatermarking.doc [retrieved on Nov. 6, 2007], pp. 1-19 (2005).

Myles, G., et al., "Detecting Software Theft Via Whole Program Path Birthmarks", Information Security, 7th Int'l Conf., ISC 2004 Proceedings (Lecture Notes in Comput. Sci. vol. 3225), Berlin, Germany, pp. 404-415 (2004).

Rick Kennell, Leah H. Jamieson, Establishing the Genuinity of Remote Computer Systems, Symposium, Aug. 4-8, 2003, pp. 295-310, Proceedings of the 12th USENIX Security Symposium, USENIX Association, Washington, D.C., USA.

W. D. Maurer, T. G. Lewis, Hash Table Methods, Article, Mar. 1975, pp. 5-19, vol. 7, No. 1, Association for Computing Machinery (ACM) Computing Surveys, New York, NY, USA.

European Patent Office PCT International Searching Authority, International Search Report for PCT Application No. PCT/EP2007/059573, Mar. 19, 2008, pp. 1-8, Rijswijk, The Netherlands.

European Patent Office PCT International Searching Authority, Written Opinion for PCT Application No. PCT/EP2007/059573, Jul. 2, 2009, pp. 1-12, Munich, Germany.

European Patent Office, Examination Report for EP Application No. 07820144.9, Jan. 16, 2012, pp. 1-3, Munich, Germany.

* cited by examiner

IDENTIFYING INTERPRETED PROGRAMS THROUGH CLASS LOADING SEQUENCES

FIELD OF THE INVENTION

The present invention relates to the data processing field. More specifically, the present invention relates to the metering of the usage of interpreted programs.

BACKGROUND ART

Metering the usage of software programs in a data processing system is of the utmost importance in several management infrastructures. A typical example consists of a license management application, which is used to collect information about known programs running on the system (for example, for charge-back accounting). A commercial license management application available on the market is the "IBM Tivoli License Manager (ITLM)" by IBM Corporation.

Generally, the license management application monitors the processes that are active on the system (for example, by retrieving a list of the active processes periodically or by intercepting the starting of every new process). The program associated with each active process is then identified by comparing its characteristics with predefined signatures of all the known programs to be metered (stored in a software catalogue); generally, each signature specifies one or more attributes (such as name and size) of an executable module associated with the active process (which running indicates the usage of the corresponding program).

A problem of the licensing management applications is the identification of the programs that are interpreted. As it is well known, an interpreted program consists of a series of instructions (written in a high-level language), which instructions are executed one at a time by an interpreter; the interpreted programs differ from compiled programs, which are previously converted by a compiler into machine code being directly executable on the system. The interpreted programs are particular attractive in open architectures, since they can be executed on different hardware and/or software platforms (provided that a corresponding interpreter is available). A typical example is that of programs written in the Java language, which programs are executed by a Java Virtual Machine (JVM).

However, when the Java programs are executed, the corresponding active process is only the one associated with the JVM; therefore, the above-described solution detects the usage of the JVM, but it is completely unable to identify the Java programs that are executed by the JVM.

In order to solve this problem, in the current practice the Java programs are instrumented with a Java toolkit being provided by the licensing management application; in this way, each Java program is updated to include a call to the licensing management application for notifying its start and stop. However, this solution is ineffective to detect the usage of all the other Java programs that are not expressly instrumented.

Another solution is that of exploiting profiling and/or debugging capabilities of some JVMs—such as the Virtual Machine Profiler Interface (JVMPI) and the Virtual Machine Debug Interface (JVMDI). However, the above-mentioned interfaces are not standard, so that they are not always available; moreover, this approach interferes with the execution of the Java programs (with a deleterious effect on their performance).

Co-pending patent application US-A-2005/0268290 instead proposes identifying the Java programs by means of the native functions that are invoked by the JVM for communicating with the underlying system—via the Java Native Interface (JNI); typically, these native functions are used to load any new class of the Java programs. For this purpose, a stub library is loaded in place of each dynamic library implementing the native functions required to load the new class; the stub library identifies the Java program that requested the loading of the new class by means of a software catalogue that associates each Java program with one or more corresponding classes. In a different embodiment, a stub class loader detects the loading of the class including a main method, which typically defines an entry point of any Java program. The main method is then updated by injecting a call to the licensing management application; as above, it is possible to identify the Java program by means of the class on which the main method was invoked (passed as an argument to the licensing management application by the injected call).

However, the above-described solution is not completely satisfactory. Indeed, when two or more different Java programs (or versions thereof) load a common class used for their identification, the licensing management application is unable to discriminate the one that is currently executed. Moreover, the proposed implementation based on the stub class loader requires updating the code of the class including the main method. Therefore, this approach is quite invasive, and it may cause unexpected malfunctioning.

All of the above prevents carrying out a full control of the interpreted programs that are executed. In the specific example at issue, this has a deleterious effect on the accuracy of the metering performed by the license management applications; the problem is particular acute in modern data processing systems (such as based on the Internet), wherein interpreted programs (and particularly Java programs) represent a large share of the market.

SUMMARY OF THE INVENTION

In its general terms, the present invention is based on the idea of exploiting the sequence of operations performed by the interpreter to identify the interpreted programs.

Particularly, the present invention provides a solution as set out in the independent claims. Advantageous embodiments of the invention are described in the dependent claims.

More specifically, an aspect of the invention provides a method for metering usage of interpreted programs (such as Java programs) on a data processing system (such as a server or a stand-alone computer). Each interpreted program is executed under the control of an interpreter (i.e., a JVM in the example of the Java programs). The method starts with the step of associating each one of a predefined plurality of interpreted programs with an indication of at least one reference sequence of actions identifying the interpreted program. At least part of the actions performed by the interpreter is monitored. It is then possible to detect the usage of each interpreted program in response to a matching of the monitored actions with an associated reference sequence. In an embodiment of the invention, each action consists of the loading of a class.

Preferably, the loaded classes are monitored by means of a wrapper for a class loader.

A way to further improve the solution is of discarding the loaded classes belonging to a predefined set of standard classes.

In a proposed implementation, all the reference sequences have the same fixed length.

As a further enhancement, hash values are used for the reference sequences.

In a different implementation, the monitored actions are continually compared with the reference sequences (until the interpreted programs matching the monitored actions reduce to at most one).

A way to further improve the solution is of stopping the verification after a predefined maximum number of monitored actions.

Another aspect of the invention proposes a computer program for performing the above-described method.

A different aspect of the invention proposes a corresponding system.

REFERENCE TO THE DRAWINGS

The invention itself, as well as further features and the advantages thereof, will be best understood with reference to the following detailed description, given purely by way of a non-restrictive indication, to be read in conjunction with the accompanying drawings, in which.

DETAILED DESCRIPTION

Figure 1:
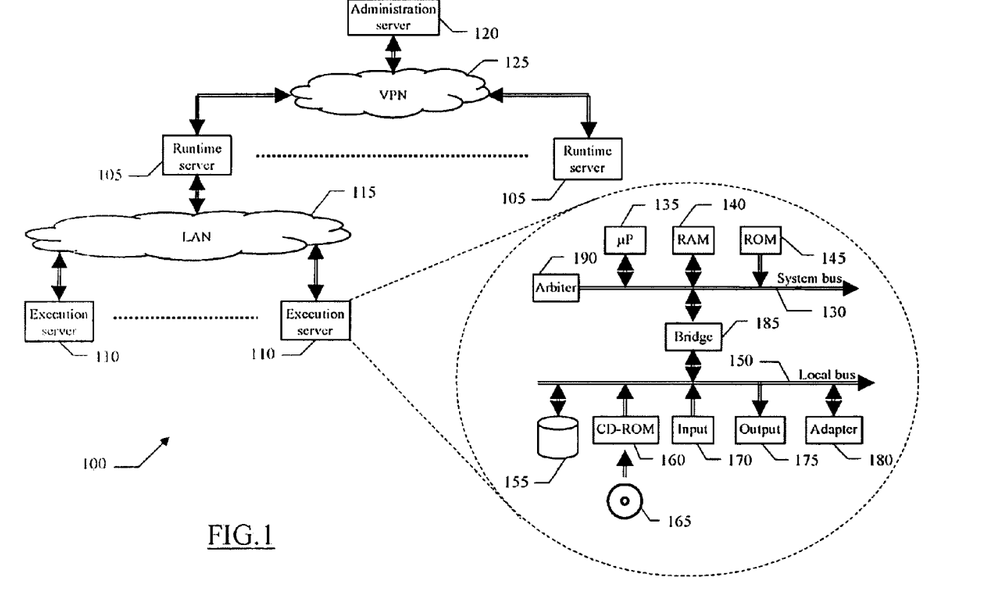
FIG. 1 is a schematic block diagram of a data processing system in which the solution according to an embodiment of the invention is applicable.

With reference in particular to FIG. 1, a data processing system 100 with distributed architecture is depicted. The system 100 implements a license management infrastructure (for example, based on the above-mentioned "ITLM"), which allows metering the usage (i.e., the execution) of selected interpreted software programs.

The system 100 includes one or more independent organizations (only one shown in the figure), which are completely separate and distinct from each other. Within the organization, different divisions are defined. Each division is controlled by a runtime server 105, which collects information about the usage of assigned interpreted programs on a set of corresponding execution servers (or nodes) 110; for this purpose, the runtime server 105 and all the execution servers 110 of the division communicate through a network 115 (for example, a LAN). The different runtime servers 105 report to a single administration server 120, which implements a central control point for inventory and procurement of the whole organization; the runtime servers 105 and the administration server 120 are connected to a different network 125 (for example, a Virtual Private Network or VPN based on the Internet).

Each execution server 110 is formed by several units that are connected in parallel to a system bus 130. In detail, one or more microprocessors (IP) 135 control operation of the execution server 110; a RAM 140 is directly used as a working memory by the microprocessor(s) 135, and a ROM 145 stores basic code for a bootstrap of the execution server 110. Several peripheral units are clustered around a local bus 150 (by means of respective interfaces). Particularly, a mass memory consists of a hard-disk 155 and a drive 160 for reading CD-ROMs 165. Moreover, the execution server 110 includes input units 170 (for example, a keyboard and a mouse), and output units 175 (for example, a monitor and a printer). An adapter 180 is used to connect the execution server 110 to the network 115. A bridge unit 185 interfaces the system bus 130 with the local bus 150. Each microprocessor 135 and the bridge unit 185 can operate as master agents requesting an access to the system bus 130 for transmitting information. An arbiter 190 manages the granting of the access with mutual exclusion to the system bus 130.

Figure 2A:
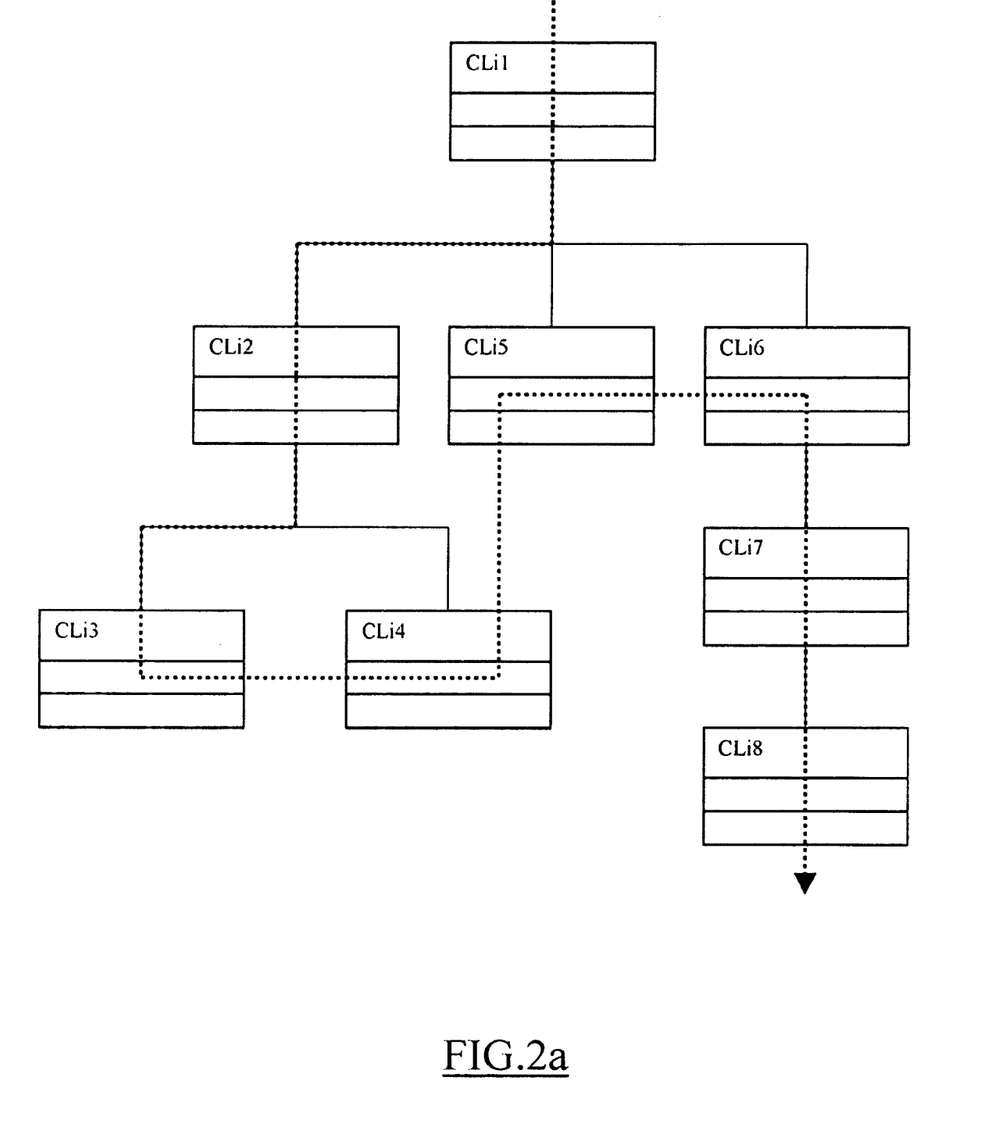
FIGS. 2a-2b illustrate an exemplary application of the solution according to an embodiment of the invention.

Considering now FIG. 2a, the interpreted programs to be metered in each division are written in an object-oriented language—such as Java. Each Java program involves the manipulation of objects—embedding the definition of both data (fields) and functions that can be applied to the data (methods); each object is an instance of a class, which consists of a template definition of the fields and methods for a particular type of objects.

Whenever the Java program needs to use a new class (for example, for instantiating the corresponding objects), the definition of the class must be loaded (typically, from a corresponding file). Generally, the Java program includes a hierarchy of classes, which are loaded in a predefined order established by its logic.

For example, the figure shows a very simplified Java program including a (root) class CLi1—having a main method typically defining an entry point of the Java program. The class CLi1 uses the (dependent) class CLi2, which in turn uses the (dependent) classes CLi3 and CLi4. The class CLi1 then uses the (dependent) class Cli5. At the end, the class CLi1 uses the (dependent) class CLi6, which uses the (dependent) class CLi7, which in turn uses the (dependent) class CLi8. Therefore, when the Java program starts its execution, the following classes are loaded in succession:

CLi1,CLi2,CLi3,CLi4,CLi5,CLi6,CLi7,CLi8

(as indicated in the figure by an arrow in dotted lines).

Figure 2B:
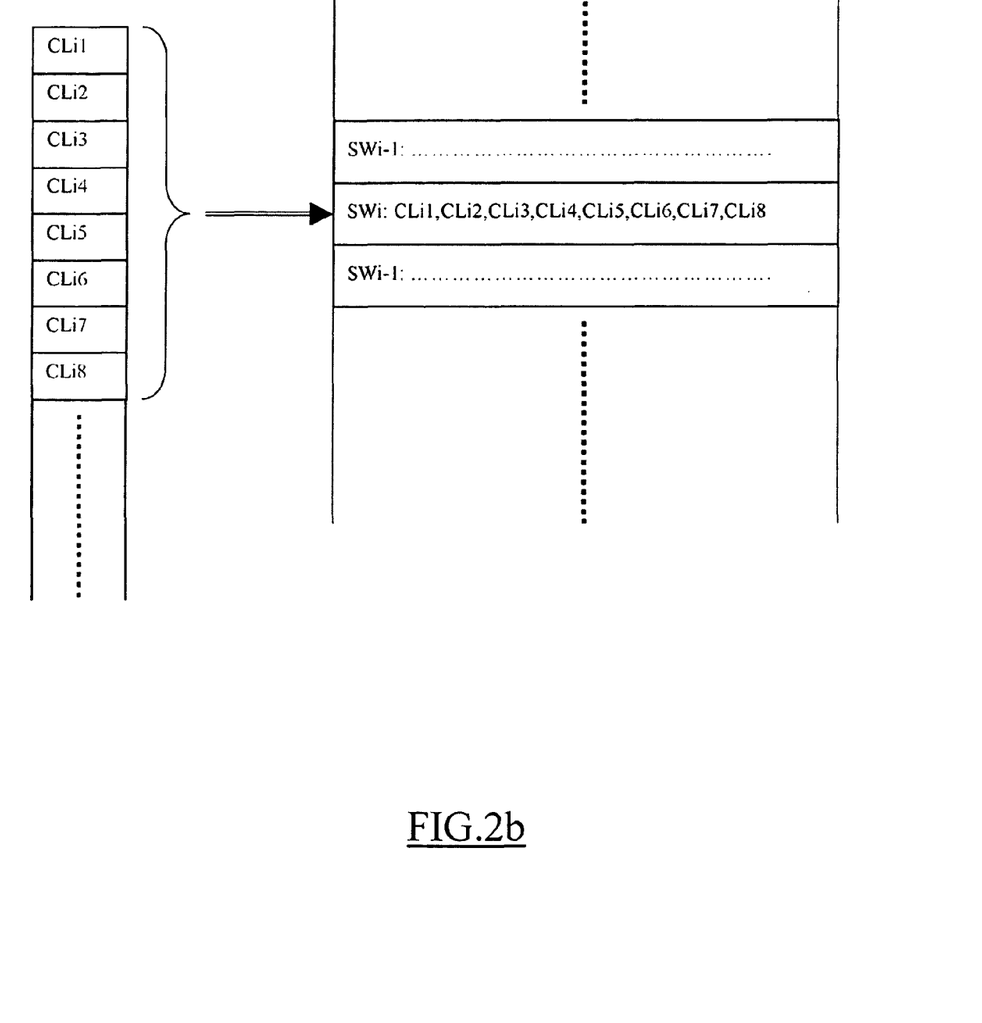

In the solution according to an embodiment of the present invention, as described in detail in the following, the sequence of loaded classes is use to identify the Java program. For this purpose, as shown in FIG. 2b, the sequence of loaded classes is compared with predefined reference sequences of classes that should be loaded by each known Java program to be metered; each one of these reference sequences of loaded classes defines a fingerprint, which uniquely identifies a corresponding Java program (requesting the loading of these classes for its execution). In this way, it is possible to look for the sequence of loaded classes among the available fingerprints; if the sequence of loaded classes matches one of these fingerprints, the usage of the corresponding Java program is detected. In the example at issue, the above-mentioned sequence of loaded classes:

CLi1,CLi2,CLi3,CLi4,CLi5,CLi6,CLi7,CLi8 identifies the Java program SWi with the same fingerprint.

The proposed solution is very accurate. Indeed, the sequence of loaded classes allow discriminating different Java programs, even if they load one or more common classes.

This makes it possible to carry out a full control of the Java programs that are executed. In the specific example at issue, this has a beneficial effect on the accuracy of the metering performed by the license management application; these advantages are clearly perceived in modern data processing systems (such as based on the Internet), wherein the Java programs (and more generally any interpreted software programs) represent a large share of the market.

Figure 3:
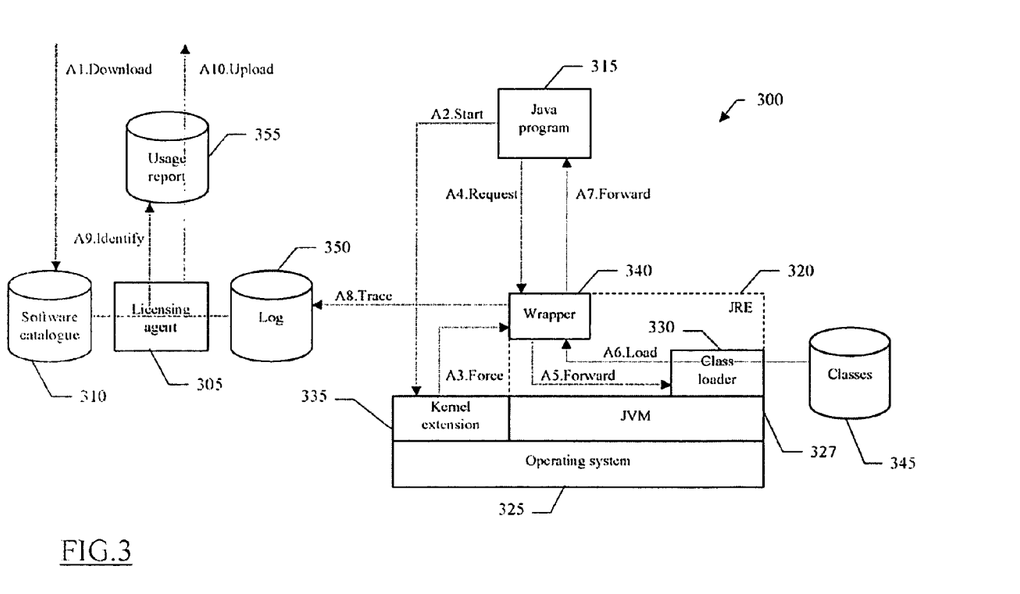
FIG. 3 is a collaboration diagram representing the roles of different software modules that may be used to implement the solution according to an embodiment of the invention.

With reference now FIG. 3, the main software modules that run on the execution server of a generic division are denoted as a whole with the reference 300. The information (programs and data) is typically stored on the hard-disk and loaded (at least partially) into the working memory of the execution server when the programs are executed. The programs are initially installed onto the hard-disk, for example, from CD-ROMs. Particularly, the figure describes the static structure of the system (by means of the corresponding modules) and its dynamic behavior (by means of a series of exchanged messages, each one representing a corresponding action, denoted with sequence numbers preceded by the symbol "A").

Particularly, a licensing agent 305 (continuously running in the background) detects the usage of any Java programs on the execution server (for example, consisting of a module of a J2EE application). For this purpose, the licensing agent 305 exploits a local copy of a software catalogue 310 that is downloaded from the runtime server of the division (not shown in the figure)—for example, periodically or at any change thereof (action "A1.Download"). The software catalogue 310 identifies each known Java program to be metered in the division by means of its fingerprint (i.e., the corresponding reference sequence of classes to be loaded).

Each Java program that is used on the execution server (denoted with 315) instantiates a corresponding Java Runtime Environment (JRE) 320. The JRE 320 defines a standard platform (for running Java programs) on top of an operating system 325 of the execution server. The main component of the JRE 320 is a JVM 327, which implements an abstract computing environment for the execution of the Java program 315; typically, the JVM 327 interprets the Java program 315 converted into an intermediate format (called bytecode format), wherein its instructions are replaced with single byte tokens. The JRE 320 also includes additional modules, such as Java core classes and supporting files (not shown in the figure); with reference more specifically to the modules relevant to the described embodiment of the present invention, the JRE 320 includes a class loader 330 that is in charge of controlling the loading of any new class required by the Java program 315.

In the solution according to an embodiment of the invention, a kernel extension 335 intercepts—for example, by means of hooking techniques—the starting of the process of the JVM 327 requested by the Java program 315 (action "A2.Start"). The kernel extension 335 updates the command initializing the JVM 327 to force the use of a wrapper 340 for the class loader 330 (action "A3.Force"). The wrapper 340 shields the class loader 330 from the outside, thereby acting as an interface between the class loader 330 and the Java program 315. In this specific context, the wrapper 340 exposes the same interface as the class loader 340 (so that its presence is completely opaque to the Java program 315).

Therefore, whenever the Java program 315 requires the loading of any new class, a corresponding request (including the name of the new class) is received by the wrapper 340 instead of the class loader 330 (action "A4.Request"). The wrapper 340 forwards the request to the class loader 330 (action "A5.Forward"). The class loader 330 transforms the name of the new class into a corresponding file name, and then reads the definition of the new class from a file 345 of that name; the same operations are repeated for any further new class that is used in the definition of the one just loaded. The definition of each loaded class is then returned to the wrapper 340 (action "A6.Load"). The wrapper 340 forwards this information to the Java program 315 directly (action "A7.Forward").

At the same time, the wrapper 340 adds the name of any loaded class to a log 350 (action "A8.Trace"). In this way, the desired result is achieved without requiring any change to the Java program 315 to be metered. It should be noted that each Java program 315 creates its own JRE 320 with the corresponding wrapper 340; therefore, each sequence of loaded classes stored in the log 350 always relates to the corresponding (single) Java program 315 (so that no risk exists of mixing multiple sequences of loaded classes from different Java programs).

As described in detail in the following, the licensing agent 305 compares the sequence of loaded classes (from the log 350) with the content of the software catalogue 310 to identify the Java program 315 in use on the execution server; the information relating to the identified Java program 315 (such as its name, starting time, stopping time, and the like) is added to a usage report 355 (action "A9.Identify"). Periodically (for example, at the end of every day), the licensing agent 305 uploads the usage report 355 to the administration server of the division (not shown in the figure), which aggregates the usage information received from the different execution servers of the division (action "A10.Upload").

Figure 4A:
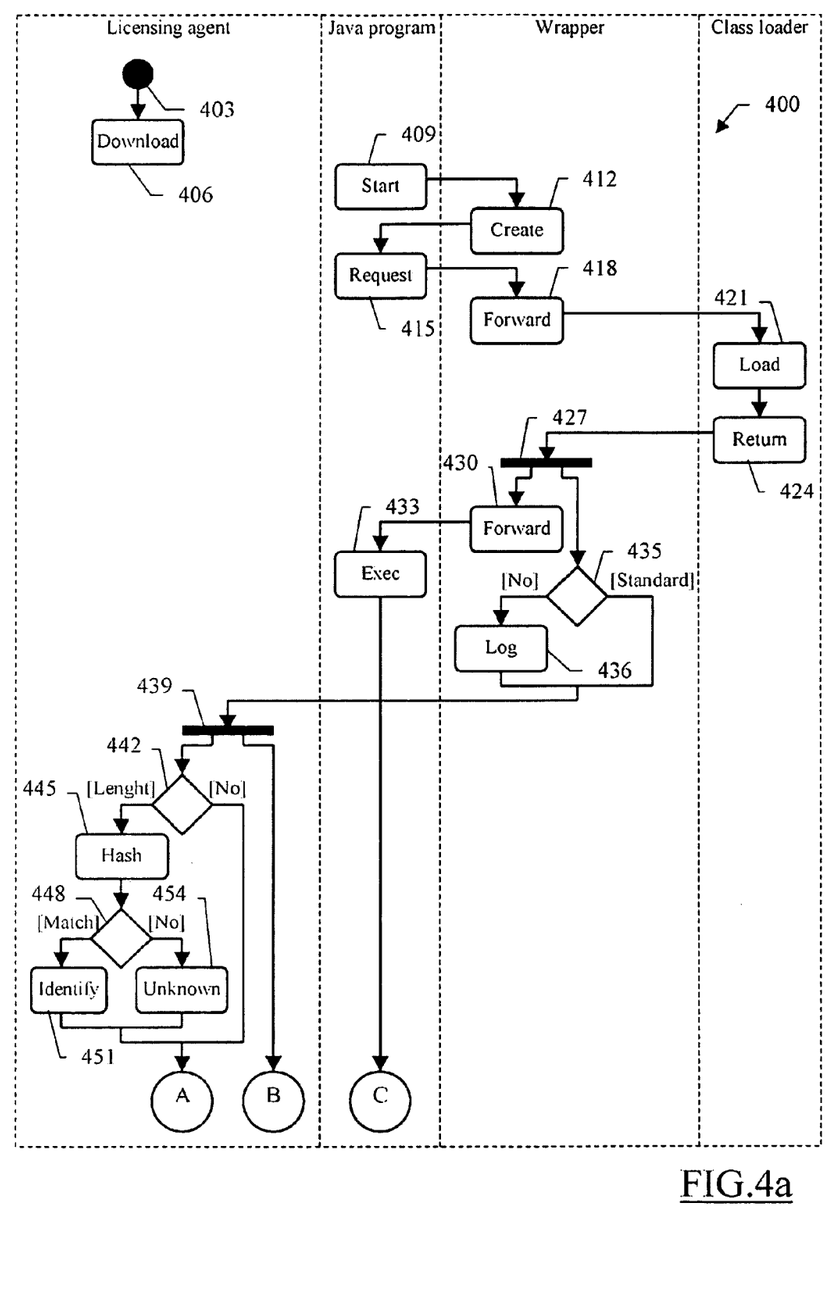
FIGS. 4a-4b show a diagram describing the flow of activities relating to an implementation of the solution according to an embodiment of the invention.
Figure 4B:
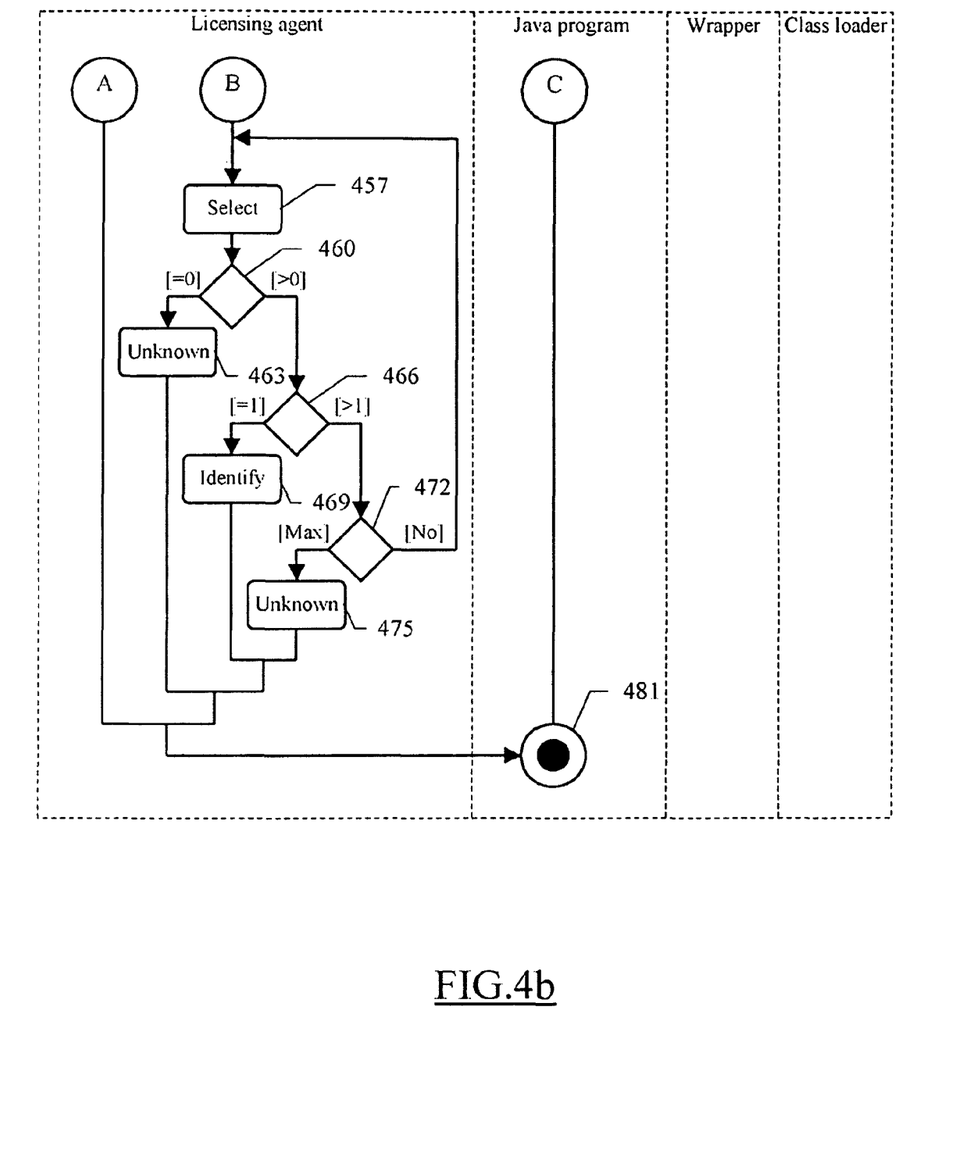

Moving now to FIGS. 4a-4b, the logic flow of an exemplary process that can be implemented to meter the usage of Java programs on a generic execution server is represented with a method 400. The method begins at the black start circle 403 in the swim-lane of the licensing agent, and then passes to block 406. In this phase, a new version of the software catalogue is downloaded from the runtime server of the division (so as to associate each Java program to be metered with the corresponding fingerprint), typically, this happens when a predefined time-out expires (for example, every week) or upon an explicit request of the runtime server (for example, after any update of the software catalogue—being performed either manually or through an automatic learning procedure).

Whenever a generic Java program to be used on the execution server is launched, a new JVM is created at block 409. As described above, the start of the corresponding process is intercepted, so as to force the use of the wrapper for the class loader (block 412). Returning to the swim-lane of the Java program, a request for loading the class having the main method defining the entry point of the Java program is submitted to the wrapper at block 415 (passing the name of this class as an argument). The wrapper at block 418 forwards the request to the class loader. In response thereto, the class loader at block 421 reads the definition of the required class and of any other classes dependent thereon from the corresponding files; typically, this operation involves the loading of a high number of classes (such as from some tens to some hundreds). Continuing to block 424, the definition of each loaded class is returned to the wrapper.

The method then forks at the synchronization bar 427 into two branches that are executed concurrently. A first branch consists of blocks 430-433, and a second branch consists of blocks 435-475; the two branches joint at the concentric white/black stop circles 481.

Considering now the first branch 430-433, the wrapper forwards the definition of all the loaded classes to the Java program at block 430. In this way, the Java program can continue its flow of execution as usual at block 433 (until it ends at the stop circles 481, with the corresponding JVM and the associated wrapper that are closed).

At the same time (in the other branch 435-475), the wrapper at block 435 compares the name of each loaded class with a predefined list of standard classes (such as including core classes of the JRE or other classes of common use among most of the Java programs). If the loaded class is not included in this list, the name of the loaded class is traced at block 436 (by adding it to the relevant log); the method then continues to the synchronization bar 439 in the swim-lane of the licensing agent. The same point is also reached from block 435 directly otherwise. As a result, it is possible to discard loaded classes that are not relevant for the identification of the Java program;

this further increases the accuracy of the proposed solution (for the same computational complexity).

With reference now to block 439, the flow of activities forks into two branches that are executed alternatively (according to different implementations of the proposed solution). A first implementation involves the execution of the blocks 442-454, while a second implementation involves the execution of the blocks 457-475; in both cases, the method then ends at the stop circles 481.

In the first implementation (blocks 442-454), the fingerprints of all the Java applications in the software catalogue are defined by corresponding reference sequences of loaded classes having a fixed length defined by a (fixed) number of loaded classes; a suggested value for the fixed number is from 10 to 100, and preferably from 20 to 70 (such as 50). The proposed values are a good compromise between the opposed requirements of accuracy (higher fixed number) and response speed (lower fixed number). Advantageously, each fingerprint is generated by concatenating the names of the loaded classes of the reference sequence in a single string; this string is then converted to a (reference) hash value (for example, by applying hashing algorithms of the XOR type). This additional feature reduces the size of the software catalogue and facilitates the search of the sequence of loaded classes in the software catalogue.

In this case, a test is made at block 442 to determine whether the number of loaded classes (stored in the corresponding log starting from the creation of the JVM for the Java program) has reached the fixed number. If so, the sequence of loaded classes is extracted from the log at block 445; in this phase, the sequence of loaded classes is converted into a hash value as above. The (current) hash value so obtained is then searched in the software catalogue at block 448. If the software catalogue includes an entry with a reference hash value equal to the current hash value, the corresponding Java program is identified at block 451. Conversely, the Java program is set as unknown at block 454. In both cases, the branch ends at the stop circles 481.

This implementation is very simple and with a low computational complexity (since the search in the software catalogue is performed only once when the sequence of loaded classes is complete).

Alternatively, in the second implementation (blocks 457-475), each fingerprint may be based on a different number of loaded classes (such as from 10 to 100); typically, shorter reference sequences may be used for Java programs that are very easy to identify (for example, because they are the sole to use specific classes); conversely, longer reference sequences may be required for Java programs that use several classes in common with other similar Java programs. Generally, the fingerprints in the software catalogue are defined by the names of the loaded classes in the reference sequences (for example, concatenated into a single string).

In this case, the sequence of classes already loaded at the moment (starting from the creation of the JVM for the Java program) is searched in the software catalogue at block 457; the search may be restricted to a set of eligible fingerprints that matched the (shorter) previous sequence of loaded classes—for example, as indicated by an invalidation flag that is asserted for each (non-eligible) fingerprint that does not match the sequence of loaded classes (with all the invalidation flags that are deasserted at the beginning). As a result, at each iteration the set of eligible fingerprints remains equal or it is reduced by removing the fingerprints that do not match the (longer) sequence of loaded classes (with the corresponding invalidation flags that are asserted). The licensing agent then verifies at block 460 the number of eligible fingerprints. If this number is 0 (meaning that none of the fingerprints in the software catalogue matches the sequence of loaded classes), the Java program is set as unknown at block 463; the method then ends at the stop circles 481. Conversely, the process branches at block 466 according to the number of the remained eligible fingerprints. If a single fingerprint exists in the software catalogue matching the sequence of loaded classes, the corresponding Java program is identified at block 469; the method then ends at the stop circles 481. Conversely (when multiple eligible fingerprints still exists), the licensing agent at block 472 checks whether the sequence of loaded classes has reached a maximum allowable number (for example, 150-250—such as 200). If so, the Java program is again set as unknown at block 475; the method then ends at the stop circles 481. This prevents overloading the execution server uselessly (i.e., when the identification of the Java program is very unlikely). Conversely, the method returns to block 457 to reiterate the same operations with a longer sequence of loaded classes (obtained by adding the next loaded class thereto).

This implementation is very flexible (since it does not set any constraint to the definition of the fingerprints); moreover, the proposed algorithm identifies the Java program as soon as possible. However, this requires repeating the search in (at least part of) the software catalogue at the loading of any new class.

Naturally, in order to satisfy local and specific requirements, a person skilled in the art may apply to the solution described above many modifications and alterations. More specifically, although the present invention has been described with a certain degree of particularity with reference to preferred embodiment(s) thereof, it should be understood that various omissions, substitutions and changes in the form and details as well as other embodiments are possible. Particularly, the proposed solution may even be practiced without the specific details (such as the numerical examples) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any disclosed embodiment of the invention may be incorporated in any other embodiment as a matter of general design choice.

Particularly, the proposed solution also lends itself to be implemented with an equivalent method (by using similar steps, removing some steps being not essential, or adding further optional steps—even in a different order).

It is emphasized that the reference to the Java language is merely illustrative; similar considerations apply to different languages (such as VisualBasic), to scripts, or more generally to any other interpreted programs (i.e., programs that cannot be executed directly on the computer but run under the control of an interpreter, either directly or after a pre-conversion).

Moreover, nothing prevents associating two of more fingerprints to each Java program in the software catalogue (on in any equivalent structure). Similar considerations apply if the fingerprints are defined in any other way indicative of the order of loading of the relevant classes. It is also possible to use different rules for determining the matching of the sequence of loaded classes with the fingerprints (for example, based on statistics techniques).

Likewise, it should be readily apparent that the use of the proposed solution is not limited to any specific licensing application; particularly, the available information may be simply used to verify compliance with applicable conditions of use, or more generally for whatever management purpose.

More generally, the solution according to the present invention lends itself to be used in different environments (such as for monitoring applications).

Although the proposed solution has been specifically designed for identifying the Java programs through the sequence of loaded classes, this is not to be interpreted in a limitative manner. More generally, the solution according to an embodiment of the invention may be implemented by monitoring any other sequence of actions performed by the interpreter (such as the reading of files, the opening of ports, the use of sockets, and the like).

The loaded classes may also be monitored in a different way—even without the use of any wrapper for the class loader (for example, by means of hooking techniques); in any case, the information about the loaded classes may be provided in whatever form (for example, being printout to a socket).

Moreover, nothing prevents discarding other standard classes for the definition of the sequence of loaded classes; however, this feature is not strictly necessary (with the same solution that may even be implemented by taking into account all the loaded classes).

With reference now to the implementation based on the fixed length of the fingerprints, the corresponding number of loaded classes may take any other predefined value.

Moreover, the hash values may be calculated with equivalent algorithms. However, the application of the same technique to fingerprints defined in any other way (for example, simply by the string with the names of the loaded classes) is not excluded.

In the other implementation based on the continual verification of the sequence of loaded classes, the eligible fingerprints may be determined in any other way (even searching the whole software catalogue at every iteration, without the use of any invalidation flag).

Additionally, the search may be terminated at the reaching of any other maximum number of loaded classes; anyway, this feature is not strictly necessary and it may also be omitted (with the search that continues until a Java program is identified or no eligible fingerprint remains).

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). In any case, the program may take any form suitable to be used by or in connection with any data processing system, such as external or resident software, firmware, or microcode (either in object code or in source code—for example, to be compiled or interpreted). Moreover, it is possible to provide the program on any computer-usable medium; the medium can be any element suitable to contain, store, communicate, propagate, or transfer the program. For example, the medium may be of the electronic, magnetic, optical, electromagnetic, infrared, or semiconductor type; examples of such medium are fixed disks (where the program can be pre-loaded), removable disks, tapes, cards, wires, fibers, wireless connections, networks, broadcast waves, and the like. In any case, the solution according to the present invention lends itself to be implemented with a hardware structure (for example, integrated in a chip of semiconductor material), or with a combination of software and hardware.

Alternatively, the proposed method may be carried out on a computer having a different architecture or including equivalent units (such as cache memories temporarily storing the programs or parts thereof to reduce the accesses to the mass memory during execution); likewise, the same solution may also be applied to a stand-alone computer, to a network of computers, and the like. More generally, it is possible to replace the computer with any code execution entity (such as a PDA, a mobile phone, and the like), or with a combination thereof (such as a client/server architecture, a grid computing infrastructure, and the like).

What is claimed is:

1. A computer-implemented method, comprising:
    associating, to meter usage of a predefined plurality of interpreted programs on a data processing system, each one of the predefined plurality of interpreted programs with an indication of at least one reference sequence of interpreter actions that identify the interpreted program, where each interpreted program is executed under control of an interpreter within a separate runtime environment and the reference sequence of interpreter actions comprises a reference sequence of at least one interpreter class load operation and at least one of a file read operation, a port opening operation, and a socket use operation;
    monitoring, from within each runtime environment, an executed sequence of interpreter actions performed by the interpreter within that runtime environment, where the monitored executed sequence of interpreter actions comprises at least one executed interpreter class load operation and at least one of an executed file read operation, an executed port opening operation, and an executed socket use operation;
    comparing a portion of the monitored executed sequence of interpreter actions performed by each interpreter with a plurality of reference sequences of interpreter actions associated with the predefined plurality of interpreted programs; and
    detecting the usage of each of the predefined plurality of interpreted programs in response to a matching of the monitored executed sequence of interpreter actions with one of the associated at least one reference sequence of interpreter actions.

2. The computer-implemented method according to claim 1, where the execution of each interpreted program comprises loading of a plurality of classes.

3. The computer-implemented method according to claim 2, where the step of monitoring comprises:
    intercepting at least one request of loading a class, being submitted by each interpreted program, by a wrapper within each runtime environment for a class loader within that runtime environment;
    forwarding the at least one request to the class loader to cause the class loader to load the class; and
    logging an indication of the loaded class by the wrapper within that runtime environment.

4. The computer-implemented method according to claim 3, where the step of logging comprises discarding each loaded class belonging to a predefined set of standard classes.

5. The computer-implemented method according to claim 1, where each reference sequence of interpreter actions comprises a fixed number of actions, and the step of comparing the portion of the monitored executed sequence of interpreter actions performed by each interpreter with the plurality of reference sequences of interpreter actions associated with the predefined plurality of interpreted programs comprises comparing a fixed number of the monitored executed sequence of interpreter actions performed by each interpreter with the plurality of reference sequences of interpreter actions associated with the predefined plurality of interpreted programs.

6. The computer-implemented method according to claim 5, where each executed interpreter action is associated with an identifier and the indication of each reference sequence of interpreter actions comprises a hash value based on identifiers of interpreter actions of the reference sequence of interpreter actions, and where the step of comparing comprises:

calculating an additional hash value of the fixed number of the monitored executed sequence of interpreter actions; and searching the calculated additional hash value among hash values of reference sequences of interpreter actions.

7. The computer-implemented method according to claim 1, where the step of detecting the usage of each of the predefined plurality of interpreted programs comprises, for each monitored executed sequence of interpreter actions, iteratively determining a set of eligible ones of the interpreted programs comprising the one of the associated at least one reference sequence of interpreter actions matching the monitored executed sequence of interpreter actions until the set of eligible ones of the interpreted programs comprises a single eligible interpreted program.

8. A system, comprising:
a processor;
a data bus coupled to the processor; and
a computer-usable storage medium embodying computer program code, the computer-usable storage medium being coupled to the data bus, the computer program code comprising instructions executable by the processor and configured for:

associating, to meter usage of a predefined plurality of interpreted programs, each one of the predefined plurality of interpreted programs with an indication of at least one reference sequence of interpreter actions that identify the interpreted program, where each interpreted program is executed under control of an interpreter within a separate runtime environment and the reference sequence of interpreter actions comprises a reference sequence of at least one interpreter class load operation and at least one of a file read operation, a port opening operation, and a socket use operation;

monitoring, from within each runtime environment, an executed sequence of interpreter actions performed by the interpreter within that runtime environment, where the monitored executed sequence of interpreter actions comprises at least one executed interpreter class load operation and at least one of an executed file read operation, an executed port opening operation, and an executed socket use operation;

comparing a portion of the monitored executed sequence of interpreter actions performed by each interpreter with a plurality of reference sequences of interpreter actions associated with the predefined plurality of interpreted programs; and detecting the usage of each of the predefined plurality of interpreted programs in response to a matching of the monitored executed sequence of interpreter actions with one of the associated at least one reference sequence of interpreter actions.

9. The system of claim 8, where the execution of each interpreted program comprises loading of a plurality of classes.

10. The system of claim 9, where the computer program code comprising instructions for monitoring comprises instructions configured for:

intercepting at least one request of loading a class, being submitted by each interpreted program, by a wrapper within each runtime environment for a class loader within that runtime environment;

forwarding the at least one request to the class loader to cause the class loader to load the class; and logging an indication of the loaded class by the wrapper within that runtime environment.

11. The system of claim 10, where the computer program code comprising instructions for logging comprises instructions configured for discarding each loaded class belonging to a predefined set of standard classes.

12. The system of claim 8, where each reference sequence of interpreter actions comprises a fixed number of actions, and the computer program code comprising instructions for comparing the portion of the monitored executed sequence of interpreter actions performed by each interpreter with the plurality of reference sequences of interpreter actions associated with the predefined plurality of interpreted programs comprises instructions configured for comparing a fixed number of the monitored executed sequence of interpreter actions performed by each interpreter with the plurality of reference sequences of interpreter actions associated with the predefined plurality of interpreted programs.

13. The system of claim 12, where each executed interpreter action is associated with an identifier and the indication of each reference sequence of interpreter actions comprises a hash value based on identifiers of interpreter actions of the reference sequence of interpreter actions, and where the computer program code comprising instructions for comparing comprises instructions configured for:

calculating an additional hash value of the fixed number of the monitored executed sequence of interpreter actions; and searching the calculated additional hash value among hash values of reference sequences of interpreter actions.

14. The system of claim 8, where the computer program code comprising instructions for detecting the usage of each of the predefined plurality of interpreted programs comprises, for each monitored executed sequence of interpreter actions, instructions configured for iteratively determining a set of eligible ones of the interpreted programs comprising the one of the associated at least one reference sequence of interpreter actions matching the monitored executed sequence of interpreter actions until the set of eligible ones of the interpreted programs comprises a single eligible interpreted program.

15. A computer-usable storage memory embodying computer program code, the computer program code comprising computer executable instructions configured for:

associating, to meter usage of a predefined plurality of interpreted programs, each one of the predefined plurality of interpreted programs with an indication of at least one reference sequence of interpreter actions that identify the interpreted program, where each interpreted program is executed under control of an interpreter within a separate runtime environment and the reference sequence of interpreter actions comprises a reference sequence of at least one interpreter class load operation and at least one of a file read operation, a port opening operation, and a socket use operation;

monitoring, from within each runtime environment, an executed sequence of interpreter actions performed by the interpreter within that runtime environment, where the monitored executed sequence of interpreter actions comprises at least one executed interpreter class load operation and at least one of an executed file read operation, an executed port opening operation, and an executed socket use operation;

comparing a portion of the monitored executed sequence of interpreter actions performed by each interpreter with a plurality of reference sequences of interpreter actions associated with the predefined plurality of interpreted programs; and detecting the usage of each of the predefined plurality of interpreted programs in response to a matching of the monitored executed sequence of interpreter actions with one of the associated at least one reference sequence of interpreter actions.

16. The computer-usable storage memory of claim 15, where the execution of each interpreted program comprises loading of a plurality of classes.

17. The computer-usable storage memory of claim 16, where the computer program code comprising instructions for monitoring comprises instructions configured for:

intercepting at least one request of loading a class, being submitted by each interpreted program, by a wrapper within each runtime environment for a class loader within that runtime environment;

forwarding the at least one request to the class loader to cause the class loader to load the class; and logging an indication of the loaded class by the wrapper within that runtime environment.

18. The computer-usable storage memory of claim 17, where the computer program code comprising instructions for logging comprises instructions configured for discarding each loaded class belonging to a predefined set of standard classes.

19. The computer-usable storage memory of claim 15, where each reference sequence of interpreter actions comprises a fixed number of actions, and the computer program code comprising instructions for comparing the portion of the monitored executed sequence of interpreter actions performed by each interpreter with the plurality of reference sequences of interpreter actions associated with the predefined plurality of interpreted programs comprises instructions configured for comparing a fixed number of the monitored executed sequence of interpreter actions performed by each interpreter with the plurality of reference sequences of interpreter actions associated with the predefined plurality of interpreted programs.

20. The computer-usable storage memory of claim 19, where each executed interpreter action is associated with an identifier and the indication of each reference sequence of interpreter actions comprises a hash value based on identifiers of interpreter actions of the reference sequence of interpreter actions, and where the computer program code comprising instructions for comparing comprises instructions configured for:

calculating an additional hash value of the fixed number of the monitored executed sequence of interpreter actions; and searching the calculated additional hash value among hash values of reference sequences of interpreter actions.

\* \* \* \* \*